UNITED STATES PATENT OFFICE.

W. DEWEES WOOD, OF PITTSBURG, PENNSYLVANIA.

MANUFACTURE OF SHEET-IRON.

SPECIFICATION forming part of Letters Patent No. 297,097, dated April 15, 1884.

Application filed December 5, 1883. (No specimens.)

*To all whom it may concern:*

Be it known that I, W. DEWEES WOOD, a citizen of the United States, residing at Pittsburg, county of Allegheny, State of Pennsylvania, have invented or discovered a new and useful Improvement in the Manufacture of Sheet-Iron; and I do hereby declare the following to be a full, clear, concise, and exact description thereof.

My present invention relates to certain improvements in the manufacture of planished sheet-iron, wherein, in connection with and as a part of the process for reviving a previously-formed oxide on the surface of the sheets, there is also employed a mixture of graphite or plumbago and oil, or other suitable oily, fatty, resinous matter.

In my Patent No. 291,260 I have described what, for convenience, I will now term the "reviving" process, and in which process, as I preferably work it, is first promoted, by artificial means, the formation of a comparatively thick or heavy oxide on each surface of each sheet, and on such surface, when formed, I apply a coating of pulverized charcoal, so that when the sheets in packs are subjected to the baking operation in the closed retort or chamber for the period of, say, four to eight hours at a high temperature, the carbon then introduced or applied between the sheets will deoxidize the oxide surface of the sheets, so as to revive or bring back to a metallic state the iron of such oxide.

My present improvement commences at this point; and it consists in combining with the reviving operation last referred to a carbonizing operation, in which latter I employ graphite or plumbago mixed with any suitable oil or greasy or fatty or resinous matter. This mixture is effected, preferably, by grinding the two together, or thoroughly intermixing them in any of the ways known to the art. For the oily ingredients I prefer to use flaxseed or olive oil, or one of the lighter hydrocarbons, such as naphtha or benzine, or, when using the resinous ingredient, I prefer turpentine or similar material.

The principal object in view and the chief element or utility attained by this mixing of graphite with oleaginous matter, which I have ascertained by experiment and trial, results from the fact that the application of the carbonizing material may be effected more uniformly and in a comparatively thin film or layer, which is all that is necessary for the purpose. I am aware that it is not new to employ graphite alone or graphite and water in connection with the reviving process; but when the dry graphite is used it cannot be distributed over the sheets with sufficient uniformity to give a uniformly good product. The sheets thus produced are more or less spotted, or lack the uniform color and polish desired, and the same fact is true when the graphite is mixed with water, for the reason that as soon as the stirring or mixing operation ceases the graphite will settle, and uniformity of application is thereby prevented. But by using oleaginous or other oily or resinous matter, as above stated, the graphite will remain so intermixed with such matter that a thin and uniform application of the same may be made to the sheets, so that their surfaces will be uniformly carbonized as the revived metal comes back to its pure or nascent condition. The mixture thus referred to is preferably made so thin that the sheets may be dipped into it, as a sufficient quantity of the mixture for the purposes in view will adhere thereto.

In practical use, the sheets, after being reduced approximately to the thickness of the finished product, and either with the ordinary oxide surface thereon or with a thicker oxide surface artificially promoted, as described in the patent above referred to, are then dipped one by one into the bath of mixed graphite and oleaginous or resinous matter, and are then pressed between suitable rolls, such as to remove any surplus of adhering mixture. The sheets are then put up in packs, with interposed layers of pulverized charcoal, each of a sixteenth of an inch, more or less, in thickness, and are then placed in closed retorts or baking-chambers, and are covered with charcoal upon the edges, or otherwise protected, as may be desired. They are then subjected to a heating or baking operation at a very high red heat for a period—say from four to ten hours, more or less, or until the oxide on the surface of the sheets shall have been revived or brought back to the condition of metallic iron, (which I believe is done wholly by the action of the charcoal,) and also until the surface so revived shall have been carbonized, and this, I believe, is done by the action of the graphite and oleaginous or resinous mixture above described. The sheets are then removed from the retort, and the unconsumed carbon is removed from the surfaces of the sheets by the use of a broom, a steam or air jet or jets, or otherwise, while yet hot, and when steam is used for this purpose it may be used in a superheated condition, as described in the patent above referred to; or the cleaning off of unconsumed carbon may be done after the sheets are cooled down preparatory to reheating, rolling, or hammering. And the sheets are then, in packs, rolled or hammered in the manner well known in the art with reference to the production thereon of the fine glazed appearance, such as is characteristic of planished iron, with or without, but preferably with, intermittent reductions, as already practiced in the art. When further work is done by rolling, the packs are preferably small—say from three to ten sheets in a pack—and when done by hammering the packs may contain from fifty to one hundred each, more or less.

The same operation may be performed on the sheets, and the work done in the same way as above described, except that after they are removed from the retort or baking-chamber they have to be further reduced to the approximate thickness desired by a further rolling operation.

I claim herein as my invention—

1. As an improvement in the method of manufacturing sheet-iron set forth in Patent No. 291,260, simultaneously reviving and carbonizing the surface of the sheet by the conjoint application thereto of charcoal, and a mixture of graphite with suitable oleaginous or resinous matter, substantially as described.

2. As a step in the manufacture of planished sheet-iron, applying to the oxidized surface of the sheet, preliminary to a reviving operation, a mixture of graphite and oleaginous or resinous matter along with pulverized charcoal, substantially as set forth.

In testimony whereof I have hereunto set my hand.

W. DEWEES WOOD.

Witnesses:
S. HARVEY THOMPSON,
J. SNOWDEN BELL.